US006178491B1

(12) United States Patent
Ben-Ephraim et al.

(10) Patent No.: US 6,178,491 B1
(45) Date of Patent: Jan. 23, 2001

(54) METHOD FOR STORING DATA STRUCTURES IN MEMORY USING ADDRESS POINTERS, AND APPARATUS

(75) Inventors: Arie Ben-Ephraim, Herzlia; Vitaly Sukonik, Hadera; Avi Ginsberg, Even Yehuda; Alexandre Saper, Oranit; Alex Miretsky, Haifa, all of (IL)

(73) Assignee: Motorola Inc., Schaumburg, IL (US)

( * ) Notice: Under 35 U.S.C. 154(b), the term of this patent shall be extended for 0 days.

(21) Appl. No.: 09/273,371

(22) Filed: Mar. 22, 1999

(30) Foreign Application Priority Data

Mar. 27, 1998 (EP) .................................................. 98105603

(51) Int. Cl.[7] .................................................. G06F 12/02
(52) U.S. Cl. ......................... 711/220; 711/173; 711/129; 711/168; 711/201; 712/204; 712/206; 712/210; 712/211; 712/212; 712/213
(58) Field of Search ............................... 711/3, 125, 129, 711/168, 173, 201, 220; 712/204, 206, 210, 211, 212, 213

(56) References Cited

U.S. PATENT DOCUMENTS

| 3,918,027 | 11/1975 | Lechner | 714/822 |
| 4,606,002 | 8/1986 | Waisman | 707/3 |
| 5,742,782 | * 4/1998 | Ito et al. | 712/210 |
| 5,761,470 | * 9/2000 | Yoshida | 712/210 |
| 5,859,793 | * 1/1999 | Satani et al. | 365/63 |
| 5,970,235 | * 10/1999 | Witt et al. | 395/389 |
| 6,009,504 | * 12/1999 | Krick | 711/220 |

OTHER PUBLICATIONS

"A multiple stack manipulation procedure" by James F. Korsh and Gary Laison, Communications of the ACM, Nov. 1983, vol. 26, No. 11, pp. 921–923.
"Executing compressed programs on an embedded RISC architecture" by A. Wolfe, A. Chanin, 1992 IEEE, pp. 81–91.

* cited by examiner

Primary Examiner—Hiep T. Nguyen
(74) Attorney, Agent, or Firm—Daniel D. Hill (57) ABSTRACT

A compiler system (190) stores a data structure (101, e.g., a program) to a memory (110) of an execution system (100). The data structure (101) comprises, for example, processor instructions coded by compressed portions of variable lengths. The compiler system (190) partitions some or all memory lines (115) of the memory (110) into $P \geq 2$ partitions, e.g., $\alpha$ and $\beta$, and writes code portions A to a first partition (e.g., $\alpha$) and second code portions B to a second partition (e.g., $\beta$) of an adjacent memory line (115). The compiler system (190) also stores addresses for some or all of the code portions in, for example, the memory (110). The addresses (260) have pointers (a and b) which indicate start positions ($j_A$ and $j_B$) for portions A and B. Optionally, pointer magnitudes distinguish portion-to-pointer relations without the need for further identification bits.

11 Claims, 9 Drawing Sheets

CASE(3)

METHOD FOR STORING DATA STRUCTURES IN MEMORY USING ADDRESS POINTERS, AND APPARATUS

FIELD OF THE INVENTION

The present invention generally relates to computer systems and, more particularly, to methods and to systems for storing and retrieving data structures in and from memory.

BACKGROUND OF THE INVENTION

Embedded systems technology has become an important aspect of our daily life, starting with remote control devices for TV sets up to automotive engine control and navigation systems. Embedded systems development must take into account design constraints on size, weight, power consumption and other cost related parameters.

The performance benefits of adopting Reduced Instruction Set Computer (RISC) architectures in embedded systems are well recognized in the art. RISC offer efficient and small cores. In comparison to Complete Instruction Set Computers (CISC), the RISCs suffers from relatively large instruction sizes and need therefore more memory space for the software program.

The program, and generally any data structure, should be stored with a high code density. This can be achieved, for example, by off-line compressing and decompressing before execution. However, such an approach requires additional memory space for permanently or temporarily storing expanded instructions (e.g., a cache). Despite falling prices for some kind of memory (e.g., disks), memory space is still precious in embedded or similar systems.

There is a technical task to develop storing and retrieving methods which substantially do not require additional space. The present invention seeks to provide methods and computer systems which mitigate or avoid these and other disadvantages and limitations of the prior art.

DETAILED DESCRIPTION OF A PREFERRED EMBODIMENT

The present invention can be used, for example, in an embedded system that combines the advantages of RISC performance and compressed instruction storage. Decompressing can take place during program execution, and not substantially before execution. Intermediate memories (e.g., caches) are substantially not required. The present invention can save memory of external memories (e.g., disks) and internal memories (e.g., RAM, ROM). Also, existing development tools for prior art systems can be used with only minor modifications. These and other advantages of the present invention are explained in the following description.

For convenience, a glossary of terms is provided prior to the claims. As used herein, the hyphen-symbol "–" is optionally used to combine reference numbers and indices when needed for explanation.

Figure 1:
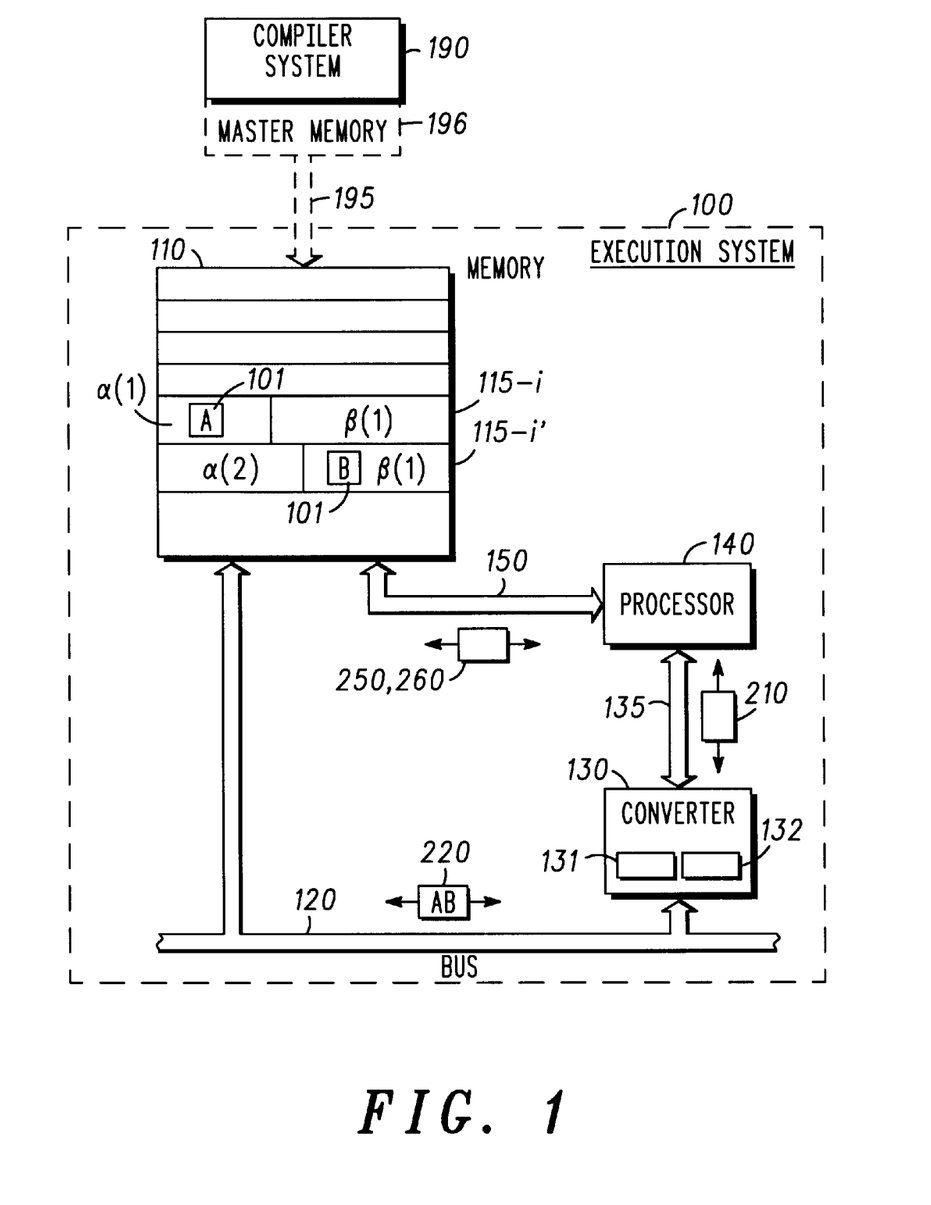
FIG. 1 illustrates a simplified block diagram of an execution system and a compiler system in which methods of the present invention are applied.

FIG. 1 illustrates a simplified block diagram of execution system 100 (dashed frame) and compiler system 190 in which methods of the present invention are applied. Preferably, execution system 100 comprises memory 110, data bus 120, converter 130, instruction bus 135, processor 140, and address bus 150. Preferably, converter 130 comprises $P \geq 2$ decoders (e.g., decoders 131 and 132). Memory 110 comprises a plurality of memory lines 115. Some or all of memory lines 115 are virtually divided into $P \geq 2$ partitions (e.g., partitions α and β, details later). The partitions have varying lengths to accommodate different data length stored therein. In other words, partitions are defined by dynamic boundaries. Memory 110 is coupled to data bus 120 which forwards compressed code words 220 (details in FIG. 2) to converter 130. Converter 130 expands code words 220 and sends instruction words 210 (cf. decoding 242 in FIG. 2) to processor 140 via bus 135. Optionally, converter 130 can bypass some code words 220 and send them as instruction words 210 without expanding. The bypass option can be supported, for example, by an indication within code words 220 or by additional control signals from processor 140. Optionally, processor 140 sends addresses 250 or 260 (details in FIGS. 5 and 7) to memory 110 via address bus 150. Code words 220 in memory 110 can also have the function of addresses 250 or 260 so that address information can also go from memory 110 to processor 150.

Optionally, busses 120, 135 and 150 are bi-directional busses which can also carry instruction words 210 from processor 140 to converter 130, code words 220 from converter 130 to memory 110, or addresses 250/260 from processor 140 to memory 110.

For the purpose of explanation, it is assumed that addresses 250/260 and data words 220 can all be stored in memory lines 115 ("data lines" and "address lines") of memory 110. Optionally, memory 110 can be divided into areas for code words 220 and for addresses 250/260. But this is not essential for the present invention.

Compiler system 190 is illustrated as being temporarily coupled to memory 110 of execution system 100 via bus 195 (dashed) and, optionally via master memory 196 (dashed). According to a storage method (e.g., method 300) of the present invention, compiler system 190 stores data structure 101 (e.g., pluralities of code portions A and B) with compressed instructions, data and addresses in memory 110 of execution system 100. For example, portion A goes into partition α and portion B goes into partition β of an adjacent memory line 115-i'. Using partitions in adjacent lines is an important aspect of the present invention. Details for data structure 101 in memory 110 are explained later. Preferably, compiler system 190 is coupled to execution system 100 once before operation of execution system 100. It is also possible, that compiler system 190 writes data structure 101 first to master memory 196. Then, second data structure 101 is exported to many execution systems 100. For simplicity of further explanations, master memory 196 and memory 110 should be assumed to be similar so that the term "memory 110" includes also memory 196.

According to a retrieval method of the invention (e.g., method 400), memory 110 retrieves data structure 101 and sends data words 220 to converter 130. Preferably, the retrieval method is applied at run time of execution system 100. Retrieving takes advantage from storing data structure 101 according to the present invention. The retrieval method can be considered as an inverse method in respect to the storage method.

Details for the operation of data bus 120, converter 130, address bus 150, and processor 140 are not subject of the present invention and are therefore not explained further. It is known in the art, how to provide, for example, busses, decoders and central processing units (CPUs) so that those of skill in the art are able to implement these system elements without the need for further explanation.

It is an important advantage of the present invention, that the software program stored in compressed form in memory 110 need less space than a similar program stored uncompressed.

Also, buses 120 and 150, converter 130 and processor 140 of execution processor 100 can conveniently be embedded into a single semiconductor substrate. The present invention is especially suitable when processor 140 is a RISC machine.

Figure 2:
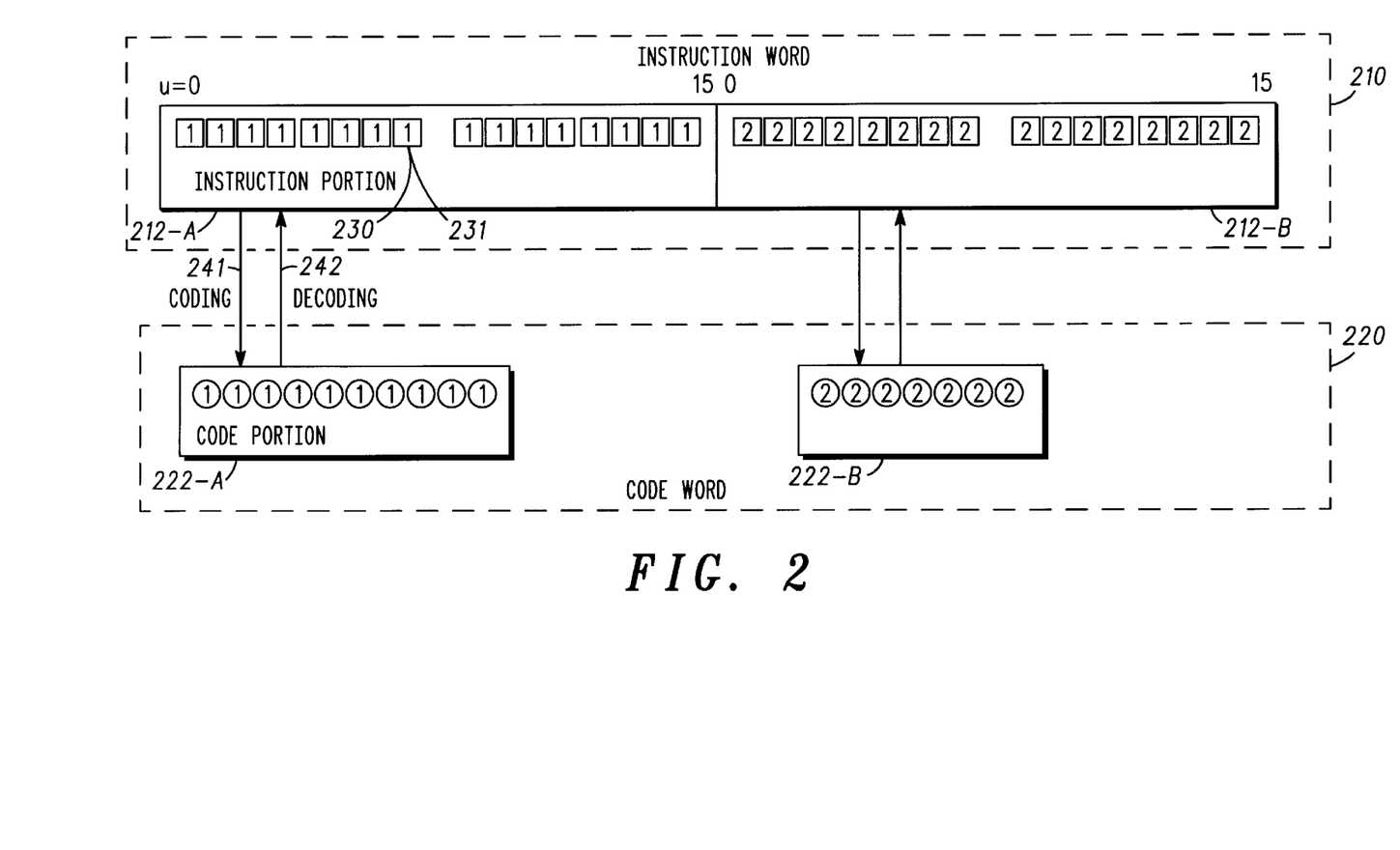
FIG. 2 illustrates a simplified block diagram of an instruction word with instruction portions and a code word with code portions.

FIG. 2 illustrates a simplified block diagram of instruction word 210 (dashed frame) with instruction portions 212-$A and 212-$B and code word 220 (dashed frame) with code portions 222-A and 222-B. Instruction word 210 can be transformed to code word 220 and vice versa. In the following, code portions 222-A and 222-B are conveniently referred to as portions A and B, respectively. The division of words 210 and 220 into P=2 portions each (A and B) is intended to be a non-limiting example. Those of skill in the art, are able, based on the description herein, to apply the present invention also for P≧2. Pluralities of code portions A and B stored in memory 110 form data structure 101 (cf. FIG. 1). Splitting the words into portions is an advantage of the present invention and saves operation time. Parallel operating devices, such as, for example decoders 131 and 132, need less time to transform separate portions than a single device would need to transform a complete word.

In FIG. 2 an in other figures, data units 230, which are not further divided, have symbols /①/, /②/, ①, ② or simply ○. In the figures, symbols like /①/, /②/ are illustrated by squares with numbers. Preferably, data units 230, for convenience hereinafter "bits", represent binary quantities with logical "0" and "1" values, as the case may be. But this is only a convention used for the simplicity of explanation. Those of skill in the art are able, based on the description herein, to use other values. The actual value (e.g., "0" or "1") of bits 230 is not important for the present invention.

Conveniently, instruction portions 212-$A and 212-$B each have U instruction bits 231 (e.g., U=8 bits /①/ and U=8 bits /②/, respectively). The lengths $V_A$ and $V_B$ (collectively V) of code portions A and B, respectively, can vary. Portion A has $V_A$ code bits 232 (e.g., $V_A$=10 bits ①) and portion B has $V_B$ code bits 232 (e.g., $V_B$=7 bits ②).

The numbers V of code bits 232 are limited by a minimum number $V_{MIN}$ ("bounded code") and a maximum number $V_{MAX}$, that is:

$$V_{MIN} \geqq V \geqq V_{MAX} \tag{2.1}$$

with the ≧ symbol for smaller than or equal to. In the example used for explanation herein, V can assume the following values:

$$3 \geqq V \geqq 12. \tag{2.2}$$

Having equal MIN-MAX numbers for portions A and B is convenient for explanation, but not necessary for the invention. Optionally, the numbers can also be different, that is:

$$V_{A\ MIN} \neq V_{B\ MIN} \tag{2.3}$$

$$V_{A\ MAX} \neq V_{B\ MAX} \tag{2.4}$$

As shown by unidirectional arrows, coding 241 transforms instruction portion 212-$A to code portion A and instruction portion 212-$B to code portion B. Preferably, coding is performed with compression so that V≦U. This is convenient, but not essential for the present invention. Preferably, decoding 242, is performed by expanding in, for example, decoders 131 and 132. Code portion A and B are re-transformed to instruction portions 212-$A and 212-$B, respectively.

Methods and devices for coding and decoding are well known in the art. The following reference [1] gives an introduction to coding and decoding: Bernard Sklar: "DIGITAL COMMUNICATIONS Fundamentals and Applications", published by Prentice Hall, Englewood Cliffs 1998, ISBN 0-13-211939-0, especially chapter 11.6 "Source Coding" on pages 595–667. Therefore, persons of skill in the art are able, based on the description herein, to practice the present invention using known coders and decoders (e.g., in compiler system 190 and decoders 131/132 of converter 130) without the need for further explanation. Conveniently, code words 220 used in the present invention are Huffman coded (see sub-chapter 11.6.2 of [1] with a coding tree). The Huffman code is a prefix-free code (e.g., no additional bits between ① and ② required) and a variable length code (e.g., lengths V are different). Huffman coding (e.g., coding 241) is assumed here only for the purpose of explaining the present invention and not intended to be limiting.

The present invention can also be applied for encrypting or decrypting data. Preferably, the number of possible variations (e.g., $2^{(U*P)}$ of instruction bits 231 is adapted for RISC processors (e.g., processor 140).

As explained later, compiler system 190 receives instruction words 210, performs coding 241, and writes portions A and B to adjacent memory locations in memory 100. When execution system 100 operates, converter 130 receives portions A and B substantially simultaneously or with a time delay which can be neglected. In converter 130, decoder 131 of converter 130 decodes (cf. step 242) portion A to instruction portions 212-A; and decoder 132 decodes portion B to instruction portion 212-B. Decoders 131 and 132 operate substantially in parallel and provide instruction word 210 substantially to processor 140 in a just-in-time schedule at processor run time. Extra memory (e.g., cache) to store instruction words is not required. This is an important advantage of the present invention.

Figure 3:
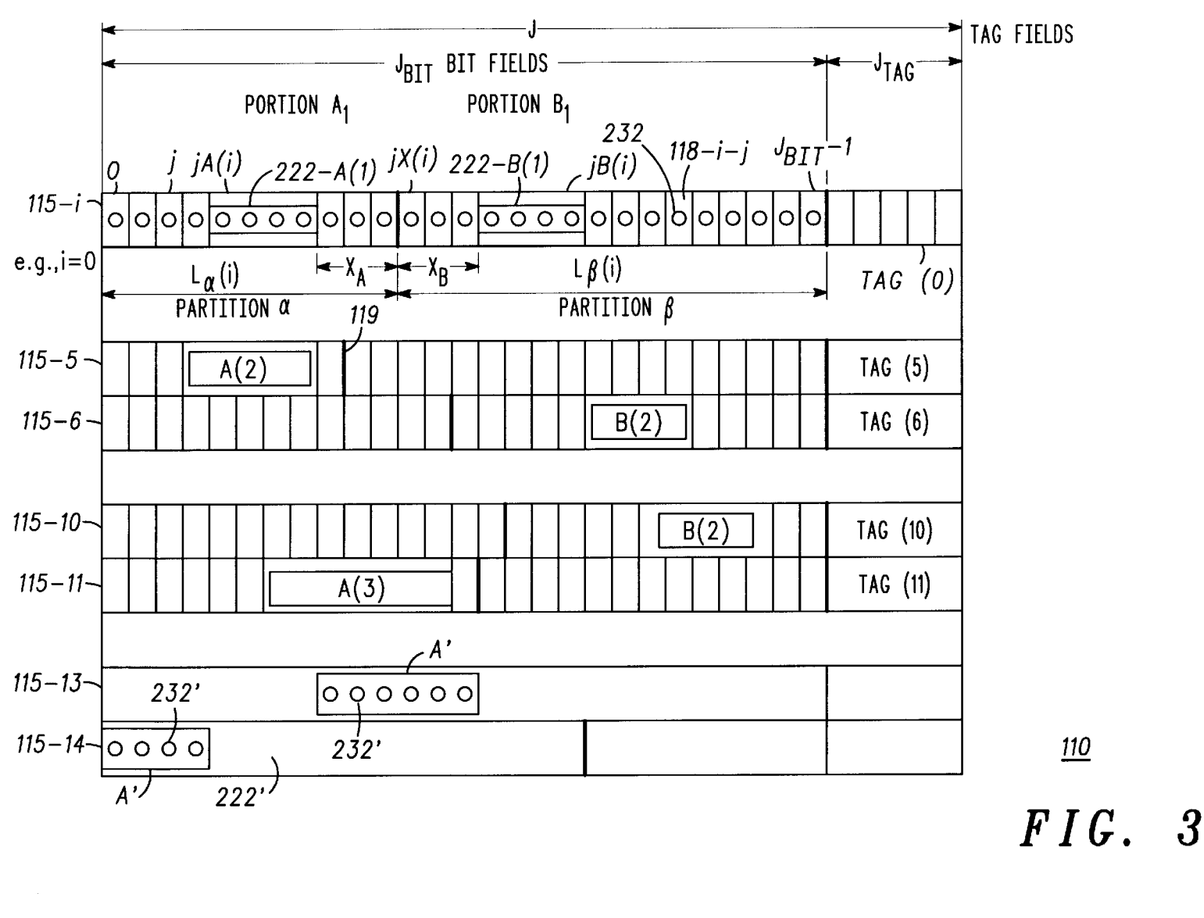
FIG. 3 illustrates a simplified block diagram of a memory of the execution system of FIG. 1 which is virtually partitioned according to a storage method of the present invention.

FIG. 3 illustrates a simplified block diagram of memory 110 of execution system 100 of FIG. 1 which is virtually partitioned according to a storage method of the present invention. Memory 110 has memory lines 115-i with line index i=0 to I−1, wherein e.g., I=14 is not important for the invention. For simplicity, FIG. 3 illustrates only memory lines 115-0, 115-5, 115-6, 115-10, 115-11, 115-13 and 115-14. Line number I is usually much higher, e.g., $I=2^{22} \approx 4.000.000$. Preferably, each memory line 115-i has J memory fields 118-i-j identified by line index i and position index j=0 to J−1 (e.g., J=32). A number of $J_{BIT}$ (e.g., $J_{BIT}$=27) fields are "bit fields" and store code bits 232 (cf. FIG. 2, ○ symbols). A number of $J_{TAG}$ (e.g., $J_{TAG}$=5) fields are "tag fields" and store a line tag T(i). The numbers are related as:

$$J_{BIT} + J_{TAG} = J \tag{3.1}$$

For convenience, FIG. 3 has double-arrowed measuring lines for bit numbers. Preferably, the positions of the bit fields and tag fields within the range between j=0 and j=J−1 are constant. In the example, of FIG. 3, bit fields have position indices between j=0 and $(J_{BIT}-1)$ (e.g., 0 and 26). Tag fields have position indices between $j=(J=J_{TAG})$ and (J−1) (e.g., 27 and 31) shown on the right side.

In each memory line 115-i, line tag T(i) is a partition indicator and classifies the plurality of bit fields into P≧2 partitions. For convenience of explanation, assume, that P has the value P=2 (as in FIG. 2). Hereinafter, partitions are referred to as "partition α" a "partition β". T(i) conveniently comprises a representation for partition index $j_X(i)$. In the example of FIG. 3, the 5 bits of T(i) can identify any number $j_X(i)$ between 0 and $J_{BIT}-1 \leq 2^5$. For example, T(0) of memory line 115-0 points to $j_X(0)$=11 and partition α comprises the 11 bit fields 118 from j=0 to j=10 and partition β comprises the 16 bit fields 118 from $j=j_X(0)$=11 to $j=J_{BIT}-1$=26. Using $J_{BIT}$ and position index $j_X(i)$, partition lengths $L_\alpha(i)$ and $L_\beta(i)$ can be defined as follows:

$$L_\alpha(i) + L_\beta(i) = J_{BIT} \tag{3.2}$$

$$L_\alpha(i) = j_X(i) \tag{3.3}$$

$$L_\beta(i) = J_{BIT} - L_\alpha(i) \tag{3.4}$$

In other words, $L_\alpha$ is a complement to $L_\beta$. Primed index i' which identifies memory line 115-i' is used accordingly. For convenience of explanation, boundary 119 is illustrated in each memory line 115-i between memory field 118-i-($j_X$(i)−1) and field 118-i-$j_X$(i). Boundary 119 is virtual and used only for convenience of explanation. In a real hardware implementation of memory 110 there is no need for a boundary.

According to the invention, compiler system 190 writes portions A into partition α of memory line 115-i and portion B into partition β of memory line 115-i' (primed), wherein memory lines 115-i and 115-i' are adjacent lines. Portions are illustrated by partly hatched boxes (reference 222) surrounding the $V_A$ and $V_B$ code bits ○. The term "adjacent" used herein is intended to include that memory lines 115-i and 115-i' can be single memory line 115-i=115-i' or two lines which are located at a predetermined line distance d between i' and i:

$$d = |i' - i| \tag{3.5}$$

Symbols | | stand for absolute values. "Adjacent" should also include, that portion A can have code bits 232 stored in memory line 115-i and further code bits 232 stored in memory line 115-(i+1). FIG. 3 gives an example by portion A' (reference 222') having first code bits 232' in partition α of line memory 115-13 and further code bits 232" in partition α of memory line 115-14. Similarly, portion B can have code bits 232 stored in memory lines 115-i' and memory lines 115-(i'+1). Preferably, line distance d is one: d=1. This is convenient, but other values for d can also be used. For d=1, three cases ("instruction placements") can be distinguished: In case (1), both portions A and B are stored in single memory line 115-i (e.g., portions $A^{(1)}$ and $B^{(1)}$ in memory line 115-0); in case (2), portion A is stored in memory line 115-i and portion B is stored in next memory line 115-(i+1) (e.g., $A^{(2)}$ in memory line 115-5 and $B^{(2)}$ in memory line 115-6): and in case (3), portion A is stored in line i and portion B is stored in line i−1 (e.g., $B^{(3)}$ in memory line 115-10 and $A^{(3)}$ in memory line 115-11). Superscripts (1), (2) and (3) are used here to distinguish portions in different lines. In other words, portion A is stored in line i and portion B is stored in primed line i', wherein $$i' = i \text{ for case (1) common line for A and B} \tag{3.6}$$

$$i' = i+1 \text{ for case (2) consecutive lines for A and B} \tag{3.7}$$

$$i' = i-1 \text{ for case (3) consecutive lines for B and A} \tag{3.8}$$

$$|i - i'| \leq 1. \tag{3.9}$$

According to the storage method (e.g., method 300), compiler system 190 partitions consecutive memory lines 115-i such that i and i' are within the line distance d. Using adjacent memory lines 115-i and 115-i' for storing portions A and B is convenient for retrieving and is therefore an important advantage of the present invention. According to the retrieving method (e.g., method 400, details later), converter 130 can read portions A and B substantially simultaneously so that decoders 131 and 132 can receive portions A and B, respectively, substantially simultaneously.

For further explanation, it is convenient to define start position $j_A(i)$ and $j_B(i')$ for portions A and B, respectively. A start position $j_A(i)$ within memory line 115-i indicates memory field 118-i-j ($j=j_A$) which stores the first code bit 232 of portion A. The $V_A$ code bits of portion A are counted in a first direction, that is:

$$\text{from } j_A(i) \text{ to } (j_A(i) + V_A - 1) \tag{3.10}$$

$$\text{with } 0 \leq j_A(i) \text{ and } (j_A(i) + V_A - 1) < (j_X(i) - 1) \tag{3.11}$$

such as, for example, from the left to the right. In the example of FIG. 3, portion $A^{(1)}$ with $V_A^{(1)}$=4 code bits 232 start at $j_A$=4 and ends at j=7. Similarly, start position $j_B(i')$ indicates memory field 118-i'-j ($j=j_B$) in memory line 115-i' which stores the first code bit 232 of portion B. The $V_B$ code bits are counted in a second, opposite direction, that is:

$$\text{from } j_B(i') \text{ to } (j_B(i') - V_B) \tag{3.12}$$

$$\text{with } J_{BIT} - 1 \geq j_B(i') \text{ and } (j_B(i') - V_B) \geq j_X(i') \tag{3.13}$$

In case of portions going over 2 memory lines, $V_A$ and $V_B$ can be replaced by $V'_A \leq V_A$ and $V'_B \leq V_B$ which indicate the numbers of code bits in memory lines 115-i and 115-i', respectively. In this case, the remaining $V_A - V'_A$ code bits of portion A are stored in memory line 115-(i+1); and the remaining $V_B - V'_B$ code bits of portion B are stored in memory line 115-(i'+1). The end positions of portions A and B are conveniently not identified. It is possible to send also the remaining code bits (e.g., from $j_A + V_A - 1$) to ($j_X - 1$)) stored in partitions α and β to converter 130. If Huffman coding is used, then decoders 131 and 132 can detect portion lengths $V_A$ and $V_B$ automatically.

In order to reduce $J_{TAG}$, allowable values for position index $j_X(i)$ can be limited. For example, $j_X(i)$ could be within a minimum/maximum range, that is:

$$j_{X\,MIN} \leq j_X(i) \leq j_{X\,MAX} \tag{3.14}$$

Or, $j_X(i)$ should be an even number $$j_{X\,MIN}=0, 2, 4,\qquad(3.15)$$

For convenience of explanation, and intended to give a nonlimiting example, the embodiments of the present invention are explained with $J_{BIT}=31$ bits, $j_X(i)$ with an allowable range of only two numbers and T(i) being a single bit. According to T(i), partition length $L_\alpha(i)$ and $L_\beta(i)$ (collectively L) can assume values between a minimum value $L_{MIN}$ and a maximum value $L_{MAX}$, that is $$L_{MIN} \leq L \leq L_{MAX}\qquad(3.16)$$

e.g., $L_{MAX}=L_{\alpha MAX}=L_{\beta MAX}=19$ bits "long" (3.17)

e.g., $L_{MIN}=L_{\alpha MIN}=L_{\beta MIN}=12$ bits "short" (3.18)

The partition lengths can be coded, for example, as follows:

$$L_\alpha(i)=L_{MAX} \text{ and } L_\beta(i)=L_{MIN} \text{ for } T(i)=0\qquad(3.19)$$

$$L_\alpha(i)=L_{MAX} \text{ and } L_\beta(i)=L_{MIN} \text{ for } T(i)=1\qquad(3.20)$$

For further explanation it is convenient to introduce field distances $X_A(i)$ and $X_B(i)$ in memory line 115-i. In the following, index i is not written for simplicity. Field distance $X_A$ is defined as the number of bit fields 118 between portion A and identifier $j_X$ (at boundary 119). The $X_A$ bit fields 118 belong to partition $\alpha$ and do not store code bits 232 of portion A (e.g., fields 115-i-($j_A+V_A-1$) to -($j_X-1$)). The fields are illustrated to the right of portion A. Field distance $X_A$ is conveniently calculated as:

$$X_A=j_X-j_A-V_A\qquad(3.21)$$

In the example of memory line 115-1 of FIG. 3, this means:

$$3=11-4-4\qquad(3.22)$$

Accordingly, field distance $X_B$ is defined as the number of bit fields 118 between portion B and identifier $j_X$ (left of portion B). The $X_B$ fields 118 belong to partition $\beta$ and do not store code bits 232 of portion B. Field distance $X_B$ can be calculated as:

$$X_B=j_B-j_X+1-V_B\qquad(3.22)$$

$$3=17-11+1-4 \text{ (example in line 115-1)}\qquad(3.23)$$

Those of skill in the art are able, based on the description herein, to calculate $X_A$ and $X_B$ in a different way, but without departing from the scope of the present invention. Conveniently, the $X_A$ and $X_B$ bit fields 118 of partitions $\alpha$ and $\beta$, respectively, are referred to as "partition tails".

Memory 110 can also be described as a memory having address lines (such e.g., lines 115) for storing addresses (250, 260, explained later) and data lines (e.g., lines 115) for storing pluralities of paired data portions (portions A and B), characterized in that (i) the data lines are virtually partitioned (cf. boundary 119) and store first data portions in first partitions (e.g., A in $\alpha$) with first offsets (e.g., $j_A$) and store second data portions in second partitions (e.g., B in $\beta$) with second offsets (e.g. $J_B$), wherein the second partition is located in an adjacent data line (see cases (1), (2), (3));

(ii) the address lines comprise addresses each having (i) base addresses (e.g., 255, 265, explained later) for identifying the data lines and (ii) pointers (e.g., a and b, explained later) which indicate the first and second offsets.

Figure 4:
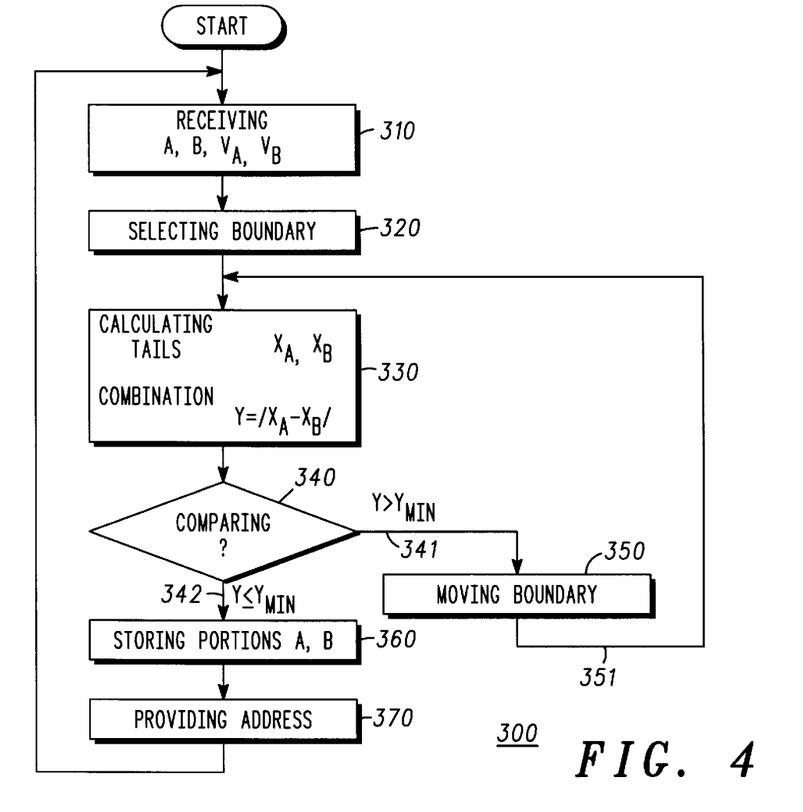
FIG. 4 illustrates a simplified flow chart diagram of the storage method.

FIG. 4 illustrates a simplified flow chart diagram of storage method 300 of the present invention. According to method 300, compiler system 190 distributes portions A and B of variable lengths $V_A$ and $V_B$ to partitions $\alpha$ and $\beta$ such that the partitions are located in adjacent memory lines. Preferably, method 300 is used for storing code portions A and B, but can also be applied to store instruction portions $A and $B. The terms "data portion" and "portion" used to describe method 300 are intended to include code and instruction portions or similar bit combinations.

For convenience of explanation, assume that compiler system 190 performs method 300. However, this is not important for the invention. Persons of skill in the art, are able based on the description herein, to use system 100 or other means without the need for further explanation.

Method 300 comprises the following steps: receiving step 310, selecting step 320, calculating tails and combination step 330, comparing step 340, moving boundary step 350, storing step 360, and, optionally, providing address step 370.

In receiving step 310, compiler system 190 receives code portions A and B and lengths $V_A$ and $V_B$, respectively. In selecting boundary step 320, compiler 190 chooses any boundary identifier $j_X$ identifier $j_X$ can be a random number between $j=0$ and $J_{BIT-1}$. Conveniently, compiler system 190 takes $j_X$ from predetermined first, second, or further values. For example in memory lines with $J_{BIT}=31$ bit fields 118, $j_X$ has either a first value of, e.g., $j_X=12$ (partition $\alpha$ with 12 fields, partition $\beta$ with 19 fields) or a second value of, e.g., $j_X=19$ ($\alpha$ with 19 fields, $\beta$ with 12 fields). In calculating tails and combination step 330, compiler system 190 obtains $X_A$ and $X_B$ distances, for example according to above mentioned equations (3.21) to (3.24). With such a calculation, $X_A$ and $X_B$ are obtained as if portions A and B would have been already written into line 115. Also, compiler calculates a distance combination Y. For example, Y is the absolute value (| | symbols) of the difference between $X_A$ and $X_B$, that is:

$$Y=|X_A-X_B|\qquad(4.1)$$

Combination Y is an indication for the symmetry by which boundary 119 virtually divides the space between memory fields 118 which are designated for portions A and B. In comparing step 340, compiler system 190 compares combination Y to predetermined reference $Y_{MIN}$, such as, for example:

$$(a) Y > Y_{MIN}\qquad(4.2)$$

$$(b) Y \leq Y_{MIN}\qquad(4.3)$$

Figure 5:
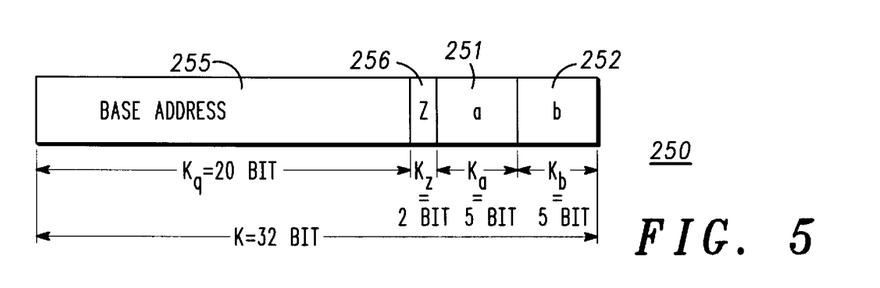
FIG. 5 illustrates a simplified block diagram of an address used in a first embodiment of the storage method.
Figure 7:
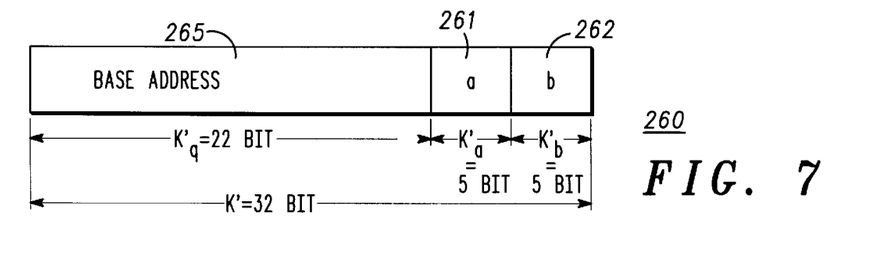
FIG. 7 illustrates a simplified block diagram of an address used in a second embodiment of the storage method.

Preferably, reference $Y_{MIN}$ has a value of $$Y_{MIN}=1\qquad(4.4)$$

but other value can also be used. The next steps depend on alternatives (a) and (b). For alternative (a) on line 341, compiler system 190 stores portion A in partition $\alpha$ and portion B in partition $\beta$ in storing step 360. Compiler can store portions A and B in adjacent memory lines 115 according to cases (1), (2), and (3) which are, preferably, chosen at random. Also, in storing step 360, compiler system 190 writes tags T(i) and T(i') into memory lines 115. Then, optionally, in providing address step 370, compiler system 190 provides addresses with bases addresses and pointers a and b (see FIGS. 5 and 7). The address can identify code portions A and B at any memory location (cf. jA(i), $j_B(i')$) within, for example, memory 110. This feature is especially important, when the address is part of a branch instruction and points to an instruction which is located far away from the branch instruction. Details for address definitions are explained later. For alternative (b) on line 341, in moving boundary step 350, compiler system 190 changes identifier $j_X$. Preferably, compiler system 190 changes $j_X$ such that Y becomes smaller and repeats (line 351) steps 350, 330 and 340 until case (a). In other words, boundary 119 is shifted until is virtually located in the center (with e.g., $Y_{MIN}=1$ allowable offset) between the portions. Now, compiler system 190 can repeat steps 310, 320, 330, 340, 350, 360 and 370 for further portions A and B for the same memory line 115 or for further memory lines 115.

Preferably, in the receptions of method step 360, a number $n_A$ of portions $A_1, A_2, A_3$ and so on (each with V . . . $\leq V_{A\ MAX}$) goes into a single partition α and a number $n_B$ of portions $B_1, B_2, B_3$ and so on (each with V . . . $\leq V_{B\ MAX}$) is written into a single partition β of the same memory line 115. The numbers are conveniently related as:

$$n_A * V_{MIN} = n_B * V_{MAX} \tag{4.5}$$

In other words, method 300 can also be described as a method for storing a data structure (e.g., structure 101) in a memory (e.g., memory 110) comprising the steps of:

(1) receiving a first data portion (e.g., A) having a first length (e.g., $V_A$) and a second data portion (e.g., B) having a second length (e.g., $V_A$) (cf. step 310);

(2) selecting an identifier (e.g., $j_X$) (or a "boundary") which virtually partitions a memory line (e.g., line 115) into a first partition and a second partition (e.g., α and β) (cf. step 320);

(3) determining a first distance (e.g., $X_A$) between the boundary and the first portion, a second distance (e.g., $X_B$) between the boundary and the second portion, and a distance combination (e.g., Y) (cf. step 330);

(4) comparing (cf. step 340) the combination to a predetermined reference (e.g., $Y_{MIN}$) and (a) changing the boundary (cf. step 350), determining and comparing again or (b) storing the first portion in the first partition and the second portion in the second partition (cf. step 360).

In other words, method 400 can be described as a method for storing a data structure (e.g., structure 101) of pluralities of code portions (e.g., A, B) into pluralities of memory lines 115 which comprises the following steps: (a) providing a first portion (e.g., portion A) and a second portion (e.g., portion B); (b) assigning a first start position (e.g., $j_A$) of the first portion within a first line (e.g., line i), and assigning a second start position of the second portion; and (c) writing into a first partition (e.g., α) of the first line: code bits of the first portion from the first start position in a first direction (e.g., to the right) and writing into a second partition (e.g., β) of the first line (e.g., as β(1)) or of a second line (e.g., as β(2)): code bits of the second portion from the second start position in a second, opposite direction (e.g., to the left), wherein partitions are chosen such, that first and second portions are stored in adjacent lines.

Further, method 400 can be described as a method for storing a data structure in memory with the following steps: (a) receiving first and second portions which in combination (e.g., A and B) belong to a single data word (e.g., code word 220), each code portion having a predetermined length (e.g., V); (b) virtually partitioning a first memory line and an second adjacent memory line into first and second partitions (e.g., α and β) by first and second partition indicator (e.g., $j_X(i), j_X(i')$ defining boundaries 119); (c) writing the first code portions into the first partition and writing the second code portion into said second partition (e.g., A to α, B to β); (d) writing representations of said first partition indicator (e.g., tag line T(i)) to said first memory line and of said second partition indicator to said second memory line (e.g., tag line T(i')); and (e) repeating the receiving, partitioning, and writing steps for further code portions (e.g., stored in next lines 115).

In the following, relations between pointers a and b, tags T(i) and T(i'), an optional indicator z, and the start positions $j_A(i)$ and $j_B(i)$ are explained.

FIG. 5 illustrates a simplified block diagram of address 250 used in the first embodiment of storage method 300 by way of example. Address 250 comprises K address bits which are distinguished as follows. $K_q$ bits form base address 255 which points to memory line 115-i; $K_z$ bits represent cases (1), (2) and (3) by location indicator z (256); $K_a$ bits represent pointer a (251); and $K_b$ bits represent pointer b (252). The bit numbers are related as:

$$K = K_q + K_z + K_a + K_b \tag{5.1}$$

Convenient values are, for example, K=32, $K_q$=20 to point to $I \leq 2^{20}$ memory lines 115-i, $K_z$=2 for the 3 cases, and $K_a=K_b=5$ which identify $j_X(i)$ by pointer a and $j_X(i')$ by pointer b, respectively.

Indicator z can be a pair of two dedicated bits $z=(z_1, z_2)$ which indicate, for example:

$$z_2 = \text{``1''}: \text{case (1)} \tag{5.2}$$

$$z_1 = \text{``1''} \text{ and } z_2 \text{ any value: case (2)} \tag{5.3}$$

$$z_1 = \text{``0''} \text{ and } z_2 \text{ any value: case (3)} \tag{5.4}$$

In other words, indicator z in address 250 corresponds to tag T(i) and T(i') stored in memory 110.

Figure 6A:
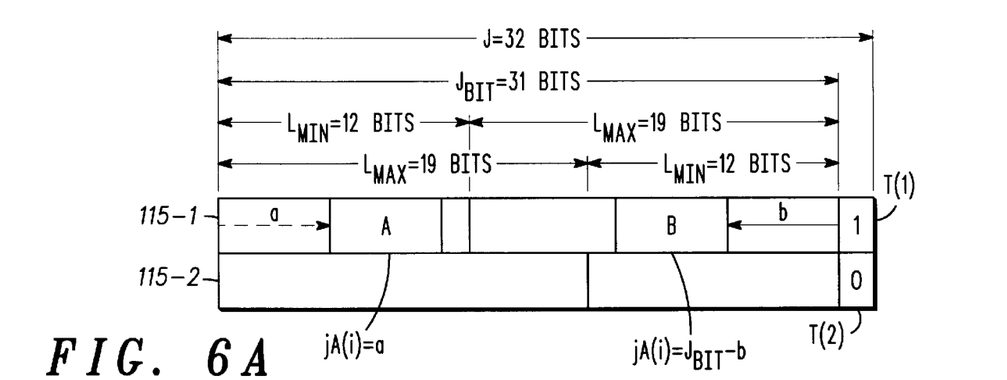
FIGS. 6A to 6C illustrate memory lines of the memory of FIG. 3 as they are used in the first embodiment.
Figure 6B:
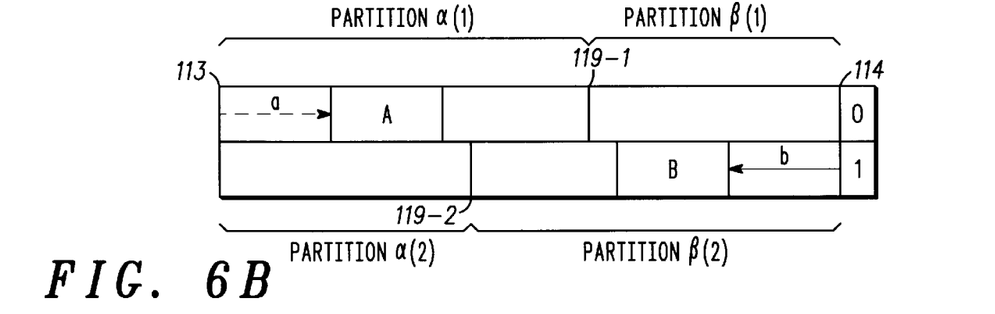
Figure 6C:
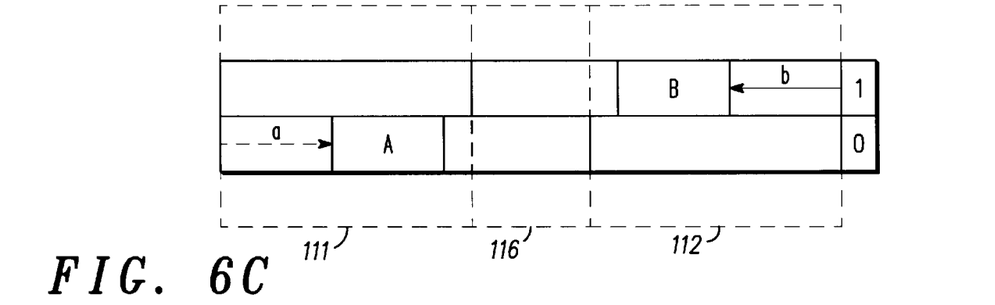

FIGS. 6A to 6C illustrate memory lines 115-1 and 115-2 of memory 110 of FIG. 3 as they are used for storing portions A and B in the first embodiment of the present invention. FIGS. 6A, 6B and 6C correspond to cases (1), (2) and (3), respectively. Lines indices 1 and 2 are used here only for convenience and can stand for any adjacent lines: in FIG. 6A, i=i'=1; in FIG. 6B, i=1, i'=2; and in FIG. 6C i=2, i'=1. For simplicity only, portions A and B are illustrated with equal sizes $V_A$ and $V_B$. But this is not important for the present invention. Boundaries 119-1 and 119-2 and tags T(1) and T(2) indicate the virtual partitioning of memory lines 115-1 and 115-2. Partitions α(1) and α(2) are illustrated left of boundaries 119-1 and 119-2, respectively; and partitions β(1) and β(2) are illustrated right of boundaries 119-1 and 119-2, respectively. Left edge 113 marks the begin of partitions α(1) and α(2) and right edge 114 marks the begin of partitions β(1) and (2). For convenience, double-arrowed lines indicate e.g., J=32 bit, $J_{BIT}$=31 bit, $L_{MAX}$=19 bit, and $L_{MIN}$=12 bit. Knowing indicator $(z_1, z_2)$ (cf. 256 in FIG. 5), pointer a identifies start position $j_A(i)$ of portion A to be in partition α(1) or α(2); and pointer b identifies start position $j_B(i')$ of portion B to be in partition β(1) or β(2). For convenience, pointer a is illustrated by a dashed arrow; and pointer b is illustrated by a plain arrow. Start positions related to pointers a and b as follows:

$$j_A(i) = a \tag{6.1}$$

$$j_B(i') = J_{BIT} - b \tag{6.2}$$

In other words, pointer a goes within portion α(i) from position j=0 (e.g., left edge 113) to the right (first direction) across a number of a code bits which do not belong to portion A; and pointer b goes within portion β(i') from position $J_{BIT}$−1 (right edge 114) to the left (second direction) across a number of b code bits. Pointers a and b are thereby guided by indicator $(z_1, z_2)$ telling which lines 115-1 or 115-2 to use in cases (1), (2) or (3) for i and for i'.

For example, possible values for pointer a are 0~11 when partition α has 12 memory fields (e.g., α(1) in FIG. 6A) or 0~18 when partition α has 19 memory fields (e.g., α(2) in FIG. 6B). The representation in the form "min~max" stand for numbers between min (including) and max (also including), that is:

$$\min \leq \text{number} \leq \max. \tag{6.3}$$

$$\text{number} \in [\min\sim\max] \tag{6.4}$$

Symbol ∈ stands for "element of set [ ]". Similarly, pointer b can also have values 0~12 or 0~18.

In general, pointer a can assume values $0 \sim L_\alpha(i)-1$ and pointer b can assume values $0 \sim L_\beta(i)-1$, wherein the portion lengths are identified by tags T(1), T(2). For example, portion A could start at left edge 113 of partition α, (a=0 ($j_A$=0)). Or, portions A could have e.g., $V'_A$=1 bit stored in portion α(i) of memory line 115-i (e.g., a=$L_\alpha(i)-1$=11) and the remaining $V'_A$ code bits are stored in memory line 115-(i+1).

FIG. 6C also illustrates an estimation for a possible of number start position combinations. Alternatively, start positions for portions A and B can be defined in reference to two lines. For example, $j'_A$ can indicate the distance from left edge 113 to a start position $j_A(1)$ in line 115-1 or to $j_A(2)$ in line 115-2. Similarly, $j'_B$ can indicate the distance from right edge 114 to start position $j_B(1)$ in line 115-1 or to $j_B(2)$ in line 115-2. Dashed frame 111 indicates $$2*L_{\alpha MIN}=2*12=24 \tag{6.5}$$

bit fields 118 in memory lines 115-1 and 115-2 (assuming "short" partitions α(1) and α(2)). Dashed frame 112 indicates also $$2*L_{\beta MIN}=2*12=24 \tag{6.6}$$

bit fields 118 in memory lines 115-1 and 115-2 (assuming short partitions β(1) and β(2). Dashed frame 116 indicates $$2*(L_{MAX}-L_{MAX})=2*(19-12)=14 \tag{6.7}$$

bit fields (assuming "long" α, "short" β or vice versa). Identifier $j'_A$ can be either $j_A(1)$ in line 115-1 or $j_A(2)$ in line 115 and point to one of the 24 fields in frame 111. Similarly, identifier $j'_B$ can point to one of the 24 fields in frame 112. The number of combinations ($j'_A,j'_B$) in frames 111 and 112 is 24*24=576. The number of combinations ($j'_A,j'_B$) in frame 116 is calculated as 14*14=196. The total number of combinations ($j'_A,j'_B$) is obtained as, for example, 576+196=772. This number includes cases (1), (2), (3) and a further case if portion A and B would both be stored in line 115-2.

In this case, the $K_a$=5 bits and $K_b$=5 bits of pointers a and b, respectively, alone would be sufficient to indicate any number of combinations ($j'_A,j'_B$) smaller then 2 to the power of ($K_a+K_b$), for example 772≤1024. Optionally, pointers a and b can form combination pointer C. Every combination ($j'_A,j'_B$) can be mapped to a single value of C. For example, pointer a forms the most significant bits (MSB) of C and pointer b forms the least significant bits (LSB) of C. For example, for position $j'_A$=1 (portions A starting at left edge 113 in α(1)) and $j'_B$ for any number 1~24 (any possible starts of portion B in frame 112), C can have values 1~24; for $j'_A$=2 and $j'_B$ any 1~24, C can have values 25~48 and so on. Persons of skill in the art are able to implement such or a similar addressing mode (with storing and retrieving) without the need of further explanation.

FIG. 7 illustrates a simplified block diagram of address 260 used in the second embodiment of storage method 300 by way of example. Address 260 comprises K' address bits which are distinguished as follows. $K'_q$ bits form base address 265 which points to line 115-i; $K'_a$ bits represent pointer a (261); and $K'_b$ bits represent pointer b (262). The bit numbers are related as:

$$K'=K'_q+K'_a+K'_b \tag{7.1}$$

Convenient values are, for example, K'=32, $K'_q$=22 to point to $I \leq 2^{22}$ memory lines 115-i, and $K'_a=K'_b$=5 which identify $j_X(i)$ and $j_X(i')$, respectively.

Compared to the first embodiment, address 260 does not comprise indicator z. Pointers a and b are related to T(i) and T(i+1) and redundancies are avoided. As an advantage, address 260 (second embodiment) with, e.g., $K'_q$=22 address bits can point to 4 times more memory fields 115-i than address 250 (first embodiment) with e.g., $K_q$=20 address bits.

In method 300 of the second embodiment, compiler system 190 stores the case indication conveniently only in memory lines 115-i but not in address 260. When memory 110 retrieves portions A and B (cf. method 400), than memory 110 determines start positions $j_A(i)$ and $j_B(i')$ from T(i) and T(i') of memory 110 and from pointers a and b of address 260.

FIGS. 8A to 8L illustrate memory lines 115-1 and 115-2 of memory 110 of FIG. 3 as they are conveniently used in the second embodiment. FIGS. 8A to 8L use similar writing conventions as FIGS. 6A, 6B and 6C. The location distinction is indicated by the combination of pointers a and b and partition indicator (e.g., (T(i)) in memory lines 115-1 and 115-2. FIGS. 8A to 8L are distinguished in table 1 which illustrates possible values for pointers a and b depending on cases (1), (2), (3) and the α/β partitioning of lines 115-1 and 115-2. Table 1 has a "TAGS"-column subdivided for T(1) and T(2) and has CASE-(1)-to-(3)-columns subdivided for a and b ranges.

TABLE 1 pointers a and b depending on cases and line partitioning for the second embodiment

| TAGS | | Case (1) FIGS. 8A to 8D | | Case (2) FIGS. 8E to 8H | | Case (3) FIGS. 8I to 8L | |
|---|---|---|---|---|---|---|---|
| T(1) | T(2) | a | b | a | b | a | b |
| 1 | 0 | 0~11 | 0~18 | 0~11 | 19~30 | 12~30 | 0~18 |
| 0 | 1 | 0~18 | 0~11 | 0~18 | 12~30 | 19~30 | 0~11 |
| 1 | 1 | 0~11 | 0~18 | 0~11 | 19~30 | 19~30 | 0~18 |
| 0 | 0 | 0~18 | 0~11 | 0~18 | 19~30 | 19~30 | 0~11 |

For case (1), pointers a and b are only used in single memory line 115-1. Therefore, pointer a is within the limits of single partition α(1) and pointer b is within the limits of single partition β(1). Pointers a and b comply with:

$$a \in [0 \sim (L_{\alpha MAX}-1)] \text{ and } b \in [0 \sim (L_{\beta MAX}-1)] \tag{8.1}$$

$$a \in [0 \sim 18] \text{ and } b \in [0 \sim 18] \tag{8.2}$$

with and standing for logical conjunctive relation. Therefore, start indices are defined for memory line 115-i= 115-i' as:

$$j_A(i)=a \tag{8.3}$$

$$j_B(i)=J_{BIT}-b \tag{8.4}$$

Such a formulation is used for retrieving method 400. For storing method 300, start positions $j_A(i)$ and $j_B(i)$ define pointers as:

$$a = j_A(i) \tag{8.5}$$

$$b = J_{BIT} - j_B(i) \tag{8.6}$$

In other words, pointer a goes from left edge 113 of partition $\alpha(1)$ across code bits which do not belong to portion A; and pointer b goes from right edge 114 of partition $\beta(1)$ across code bits which do not belong to portion B.

Pointers a and b could have maximum values of e.g., 32 (2 to the power of $K'_a$ and $K'_b$). For cases (2) and (3), a single pointer a which would start at left edge 113 of partition $\alpha(1)$ could possibly identify any start position $j_A(i)$ within some of partitions $\alpha(1)$ and $\alpha(2)$ of in total $12+19 \leq 32$ memory fields (FIGS. 8E to 8H, and FIGS. 8I to 8K). However, a single pointer a which would start at left edge 113 of partition $\alpha(1)$ could not cover all $19+19>32$ memory fields of two "long" partitions $\alpha(1)$ and $\alpha(2)$ (cf. FIGS. 8H and 8L). For pointer b, the problem would be similar.

For cases (2) and (3), the problem is avoided by starting one of the pointers at edge 113 or 114 and the other pointer at boundary 119-1 or 119-2. In other words, pointers a and b take a preferably short way. The information of boundaries 119-1 and 119-2 (i.e., T(1), T(2)) is stored in memory lines 115 and the case distinction (2) and (3) is implicitly stored in pointers a and b.

For case (2) (FIGS. 8E to 8H), pointer a complies with:

$$a \in [0 \sim (L_{\alpha MAX} - 1)] \tag{8.7}$$

similar to pointer a in case (1). Pointer a defines start position $j_A(i)$ in partition $\alpha(1)$ as:

$$j_A(i) = a \tag{8.8}$$

Pointer b is divided into a parts $b_1$ and $b_2$. The value of $b_1$ indicates the number of memory fields of partition $\beta(1)$ in which portion B is not stored.

$$b = b_1 + b_2 \tag{8.9}$$

$$b_1 = L_\beta(1) \text{ if } T(1) \neq T(2) \text{ (FIGS. 8E and 8F)} \tag{8.10}$$

$$b_1 = L_\alpha(1) = L_\beta(1) \text{ if } T(1) = T(2) \text{ (FIGS. 8G and 8H)} \tag{8.11}$$

$$j_B(i) = J_{BIT} - b_2 \text{ (in the line below)} \tag{8.12}$$

In other words, pointer a goes from left edge 113 of partition $\alpha(1)$ to portion A. For unequally partitioned lines 115-1 and 115-2 (FIGS. 8E and 8F), pointer part $b_1$ goes from boundary 119-1 in memory line 115-1 to right edge 114 and pointer part $b_2$ goes left from right edge 114 to portion B. For equally partitioned lines 115-1 and 115-2 (FIGS. 8G and 8H), pointer part $b_1$ starts at boundary 119-1 and goes to left edge 113, and pointer part $b_2$ goes in the same direction from right edge 114 to portion B in partition $\beta(2)$.

The value ranges for a and b given in table, do not cover all possible storage combinations. For example, in partition $\beta(2)$ of FIG. 8G, an area of 7 memory fields 118 is crossed out (reference 198). To avoid overlapping in the b-values, b is defined for 19~30 but not defined for 12~30. A solution which avoids this limitation is given later.

For case (3), (FIGS. 8I to 8L) pointer b similarly complies with:

$$b \in [0 \sim (L_{\beta MAX} - 1)] \tag{8.13}$$

$$b \in [0 \sim 18] \tag{8.14}$$

Pointer b defines start position $j_B(1)$ in partition $\beta(1)$ as:

$$j_A(1) = J_{BIT} - b \text{ (in the upper line)} \tag{8.15}$$

Pointer a is divided into a parts $a_1$ and $a_2$. The value of $a_1$ indicates the number of memory fields of partition $\alpha(1)$ in which portion A is not stored.

$$a = a_1 + a_2 \tag{8.16}$$

$$a_1 = L_\alpha(1) \text{ if } T(1) \neq T(2) \text{ (FIGS. 8I and 8J)} \tag{8.17}$$

$$a_1 = L_\beta(1) = L_\alpha(1) \text{ if } T(1) = T(2) \text{ (FIGS. 8K and 8L)} \tag{8.18}$$

$$j_B(2) = a_2 \text{ (in the line below)} \tag{8.19}$$

In other words, pointer b goes from right edge 114 of partition $\beta(1)$ to portion A. For unequally partitioned lines 115-1 and 115-2 (FIGS. 8I and 8J), pointer part $a_1$ goes from boundary 119-1 in memory line 115-1 to left edge 113 and pointer part $a_2$ goes left from left edge 113 to portion A. For equally partitioned lines 115-1 and 115-2 (FIGS. 8K and 8L), pointer part $a_1$ starts at boundary 119 and goes to right edge 114, and pointer part $a_2$ goes in the same direction from left edge 113 to portion A in partition $\alpha(2)$.

Figure 8A:
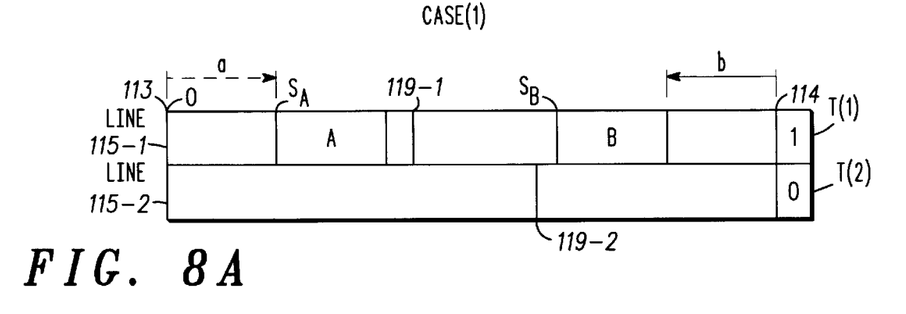
FIGS. 8A to 8L illustrate memory lines of the memory of FIG. 3 as they are used in the second embodiment.
Figure 8B:
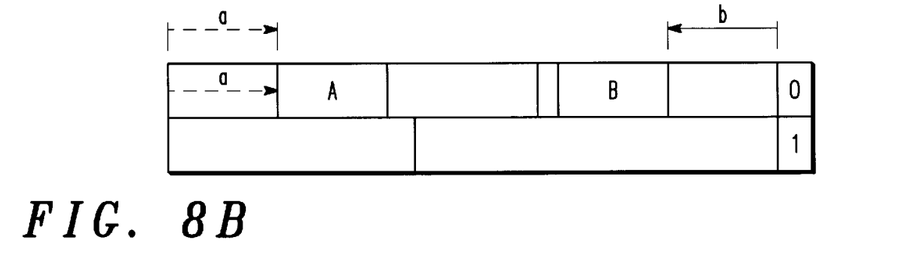
Figure 8C:
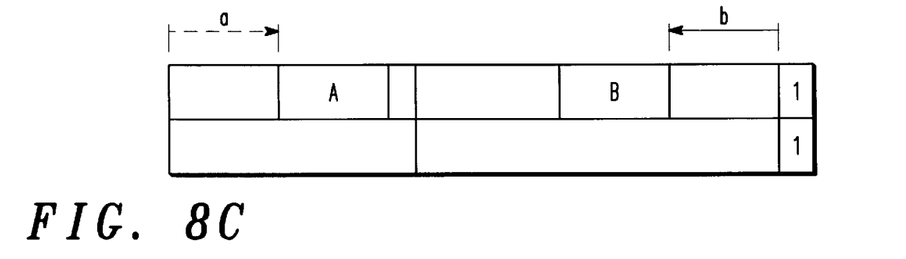
Figure 8D:
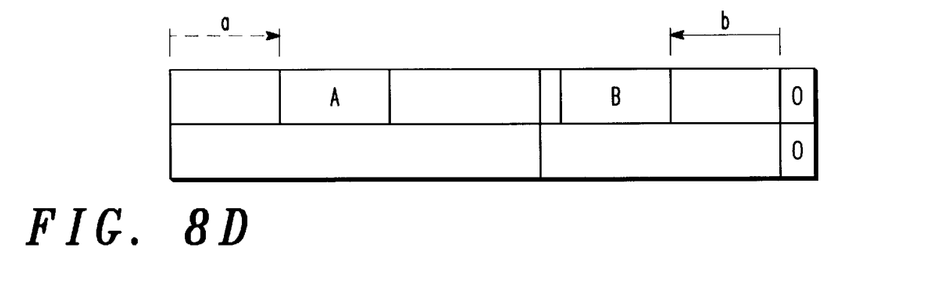
Figure 8E:
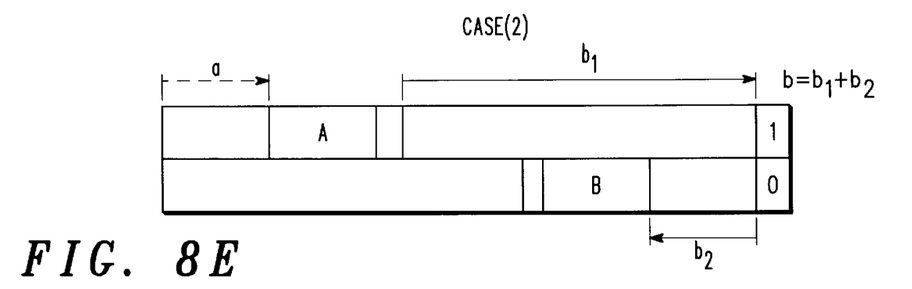
Figure 8F:
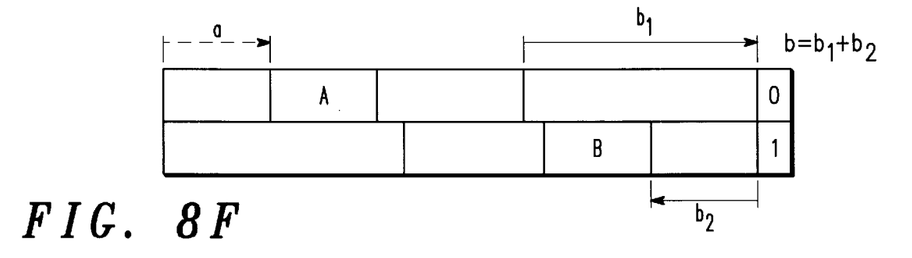
Figure 8G:
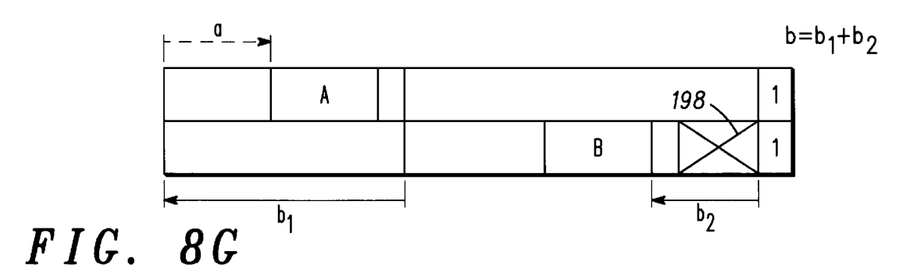
Figure 8H:
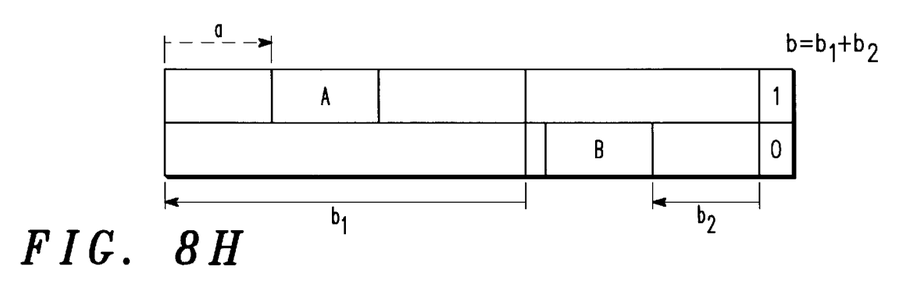
Figure 8I:
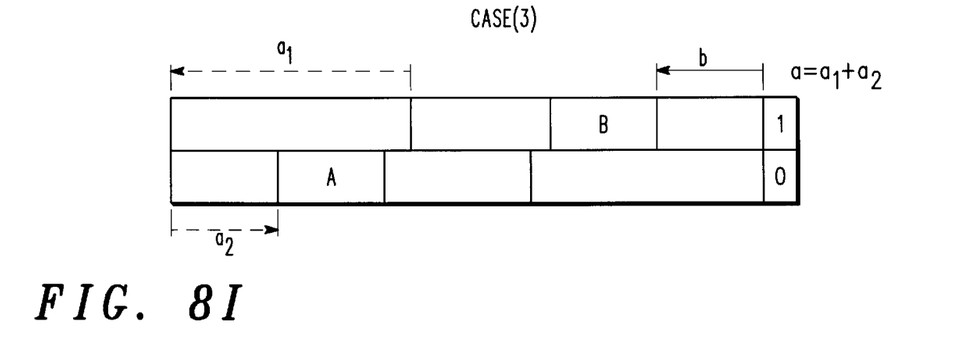
Figure 8J:
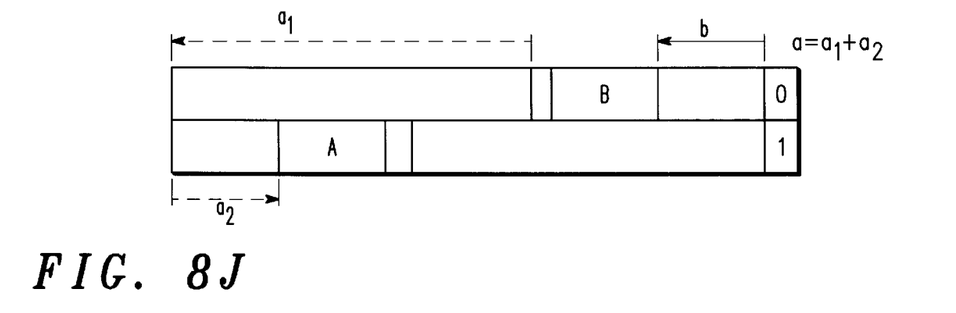
Figure 8K:
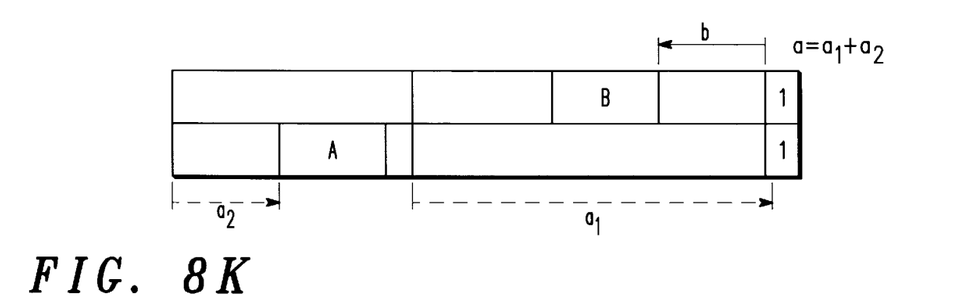
Figure 8L:
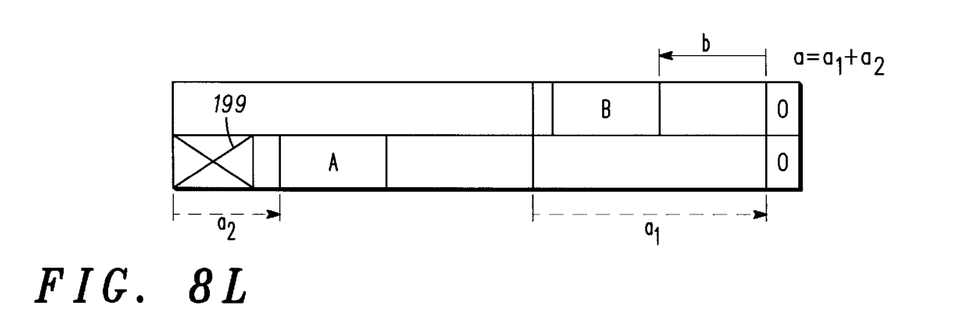

Similarly, some fields in partition $\alpha(2)$ can not be addressed and are crossing out (reference 199). Ways to avoid this are explained later.

Referring to the columns in table 1, the possible values for pointers a and b can be defined in set vectors. For example, pointer a has values in set vector $\underline{a}$ (sub-column (1) for a, sub-column (2) for a) that is:

$$\underline{a} = \{0 \sim 11, 0 \sim 18, 0 \sim 11, 0 \sim 18\} \tag{8.20}$$

The underscoring stands for "vector". The vector elements are sorted according to the possible partition configurations (e.g., configurations with two binary tags T(1), T(2)). Accordingly, a set vector $\underline{b}$ can be defined, for example, in sub-column (1) for b and sub-column (3) for b) as follows:

$$\underline{b} = \{0 \sim 18, 0 \sim 11, 0 \sim 18, 0 \sim 11\} \tag{8.21}$$

Disjunct vector $\underline{b}'$ (prime marker) is defined, for example, by sub-column (2) for b, that is:

$$\underline{b}' = \{19 \sim 30, 12 \sim 30, 19 \sim 30, 19 \sim 30\} \tag{8.22}$$

The elements in vectors $\underline{b}$ and $\underline{b}'$ are not common. Similarly, disjunct vector $\underline{a}'$ is defined, for example, by sub-column (3) for a, that is:

$$\underline{a}' = \{12 \sim 30, 19 \sim 30, 19 \sim 30, 19 \sim 30\} \tag{8.23}$$

Similarly, the elements in vectors $\underline{a}$ and $\underline{a}'$ are not common. With this requirement, cases (1), (2), (3) can be distinguished without the need for indication $(z_1, z_2)$. According to the present invention, pointers a and b belong to disjunct vectors and thereby define cases (1), (2), and (3), as for example:

Case (1): $a$ from vector $\underline{a}$, $b$ from vector $\underline{b}$ (8.24)

Case (2): $a$ from vector $\underline{a}$, $b$ from vector $\underline{b}'$ (8.25)

Case (3): $a$ from vector $\underline{a}'$, $b$ from vector $\underline{b}$ (8.25)

A further case (4) can be identified by vectors $\underline{a}$ and $\underline{b}$.

Preferably, vectors $\underline{a}'$ and $\underline{b}'$ are not only disjunct to vectors $\underline{a}$ and $\underline{b}$, respectively, but also complementary. Complementary vectors are defined, for example, as follows:

a={0~11, 0~18, 0~11, 0~18}(same as above) (8.26)

a"={12~30, 19~30, 12~30, 19~30} (8.27)

b={0~18, 0~11, 0~18, 0~11}(same as above) (8.28)

b"={19~30, 12~30, 19~30, 12~30} (8.29)

The third element 12~30 of a" (bold) differs from the third element 19~30 of a'; and the fourth element 12~30 (bold) differs from the fourth element 19~30 of b'. With such a vector definition, substantially all memory fields can be addressed in lines 115-1 and 115-2. There is no crossing out (cf. references 198, 199) needed.

Figure 9A:
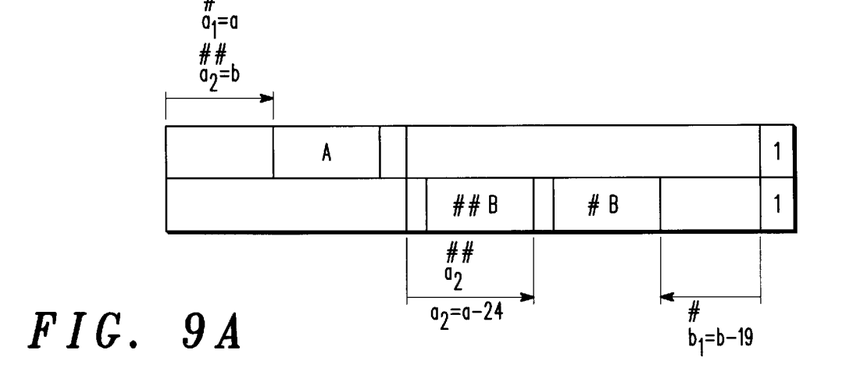
FIGS. 9A and 9B illustrate memory lines of the memory of FIG. 3 as they are used in a third embodiment.
Figure 9B:
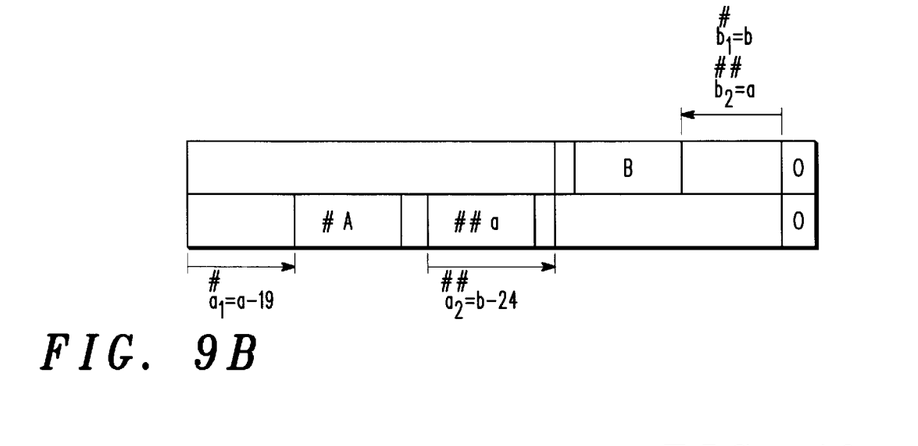

FIGS. 9A and 9B illustrate memory lines 115-1 and 115-2 of memory 110 as they are conveniently used in a third embodiment of the present invention. FIG. 9A is a modification of FIG. 8G and used instead; and FIG. 9A is a modification of FIG. 8L and used instead. For the third embodiment, FIGS. 8A to 8D (case (1)), FIGS. 8E, 8F, 8G (case (2)) and FIGS. 8I, 8J and 8K (case (3)) are applicable without modifications.

Table 2 illustrates a further classification of pointer values. Table 2 is similar to table 1. For case (2), T(1)=1, T(2)=1 (for FIG. 9A), and for case (3), T(1)=0, T(2)=0 (for FIG. 9B), the value ranges of pointers a and b are split into cases # and ##. Complementary pointer vectors are also obtained.

TABLE 2 pointers a and b depending on cases and line partitioning for the third embodiment

| TAGS | | Case (1) FIGS. 8A to 8D | | Case (2) FIGS. 8E, 8F, 9A, 8D | | Case (3) FIGS. 8I, 8J, 8K, 9B | |
|---|---|---|---|---|---|---|---|
| T(1) | T(2) | a | b | a | b | a | b |
| 1 | 0 | 0~11 | 0~18 | 0~11 | 19~30 | 12~30 | 0~18 |
| 0 | 1 | 0~18 | 0~11 | 0~18 | 12~30 | 19~30 | 0~11 |
| 1 | 1 | 0~11 | 0~18 | # 0~11 ## 24~30 | # 19~30 ## 0~11 | 12~23 | 0~18 |
| 0 | 0 | 0~18 | 0~11 | 0~18 | 19~30 | # 19~30 ## 0~11 | # 0~11 ## 24~30 |

As illustrated in FIG. 9A for case (2), pointer parts $a_1$, $a_2$, $b_1$, and $b_2$ can be defined as follows:

for #:

$a_1 = a$ (left edge 113 to portion A) (9.1)

$b_1 = b-19$ (right edge 114 to portion #B, $L_{\beta MAX}=19$) (9.2)

for ##:

$a_2 = b$ (left edge 113 to portion A) (9.3)

$b_2 = a-24$ (boundary 119 to portion ##B, $2*L_{\alpha MIN}=24$) (9.4)

As illustrated in FIG. 9B for case (3), pointer $a_1$, $a_2$, $b_1$, and $b_2$ can be similarly defined:

for #:

$a_1 = a-19$ (left edge 113 to portion #A) (9.5)

$b_1 = b$ (right edge 114 to portion B) (9.6)

for ##:

$a_2 = b-24$ (boundary 119 to portion ##A) (9.7)

$b_2 = a$ (right edge 114 to portion B) (9.8)

In other words, pointers a and b can selectively be used to indicate start positions of portions A and B, respectively, or vice versa, of start positions of portions B and A.

Figure 10:
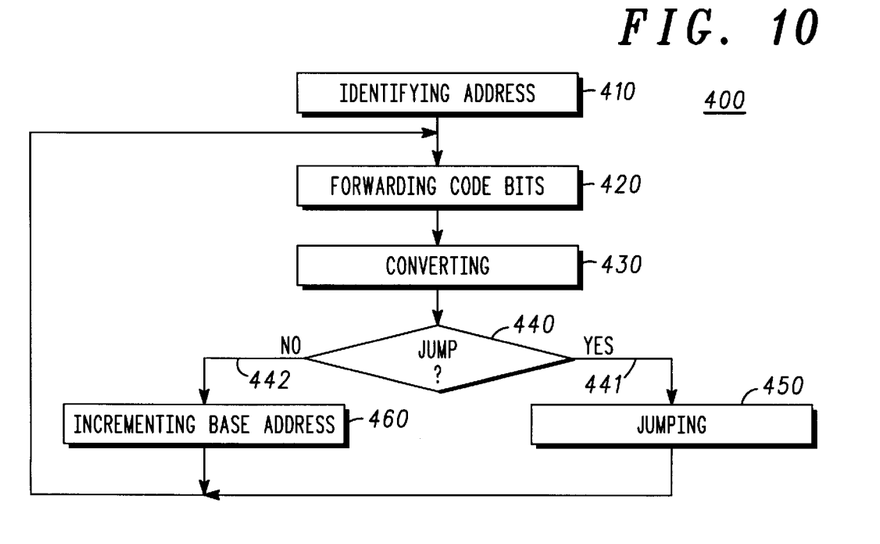
FIG. 10 illustrates a simplified flow chart diagram of a retrieval method according to the present invention.

FIG. 10 illustrates a simplified flow chart diagram of retrieval method 400 of the present invention. Retrieval method 400 is, preferably, performed by execution system 100 and, preferably, comprises identifying an address step 410, forwarding code bits step 420, converting step 430, query step 440, jumping step 450, and incrementing base address step 460.

In identifying an address step 410, processor 140 checks the currently processed instruction for addresses, for example address 250 (cf. FIG. 5) or address 260 (cf. FIG. 7). For example, the instruction (cf. instruction word 210) can be a jump instruction which comprises an address. Optionally, the address itself is coded and is converted by converter 130. This is convenient, but not essential for the invention.

In forwarding code bits step 420, memory 110 receives base address 255 of address 250 (or base address 265) which identifies memory line 115-i and 115-i'. Then, memory 110 conveniently sends all code bits 232 (cf. FIG. 3)j=1 to $J_{BIT}-1$ from memory lines 115-i and 115-i' to converter 130. The plurality of code bits 232 comprises portions A and B.

In converting step 430, decoders 131 and 132 of converter 130 receives pointers a and b from address 250 (or from address 260) and selects portions A and B from the plurality of code bits 232. Converter 130 applies case distinction criteria (e.g., cases (1), (2), (3)). For example, converter 130 receives tags T(1) and T(2) from memory lines 115 and indicator z from address 250 (cf. FIG. 5, first embodiment); or, converter 130 receives tags T(1) and T(2) and compares the magnitudes of pointers a and b with pointer vectors (second and third embodiments) as described above. Decoders 131 and 132 substantially simultaneously converts portions A and B to instruction portions 212$A and 212$B (cf. FIG. 2) of instruction word 210. Start positions $j_A(i)$ and $j_B(i)$ are used by converters 131 and 132, respectively, for example, as shift pointers, to identify portions A and B from the plurality of code bits 232.

As illustrated by query step 440 ("JUMP?"), the next steps depend on whether instruction word 210 has a jump indication ("yes"-line 441") line or does not have a jump indication ("no"-line 442"). In case of a jump instruction (line 441), memory 110 receives the new address from instruction words 210 (jumping step 450) and system 100 continues with forwarding step 420. In the other case (line 442), system 100 obtains the new address, preferably, by incrementing the base address (incrementing base address step 460) and also continues with forwarding step 420.

Persons of skill in the art are able, based on the description herein, to implement method 400 with hardware elements of execution system 100 without the need for further explanation.

Also, persons of skill in the art, based on the description herein, to apply the present invention also to memory line partitioning with P>2. For such cases, the number of pointers, pointer vectors and tags can be increased.

While the invention has been described in terms of particular structures, devices and methods, those of skill in the art will understand based on the description herein that Glossary of Terms combiner for reference numbers and indices
A identifies code portion
a pointer to code portion A, in the drawings with a dashed line
B identifies code portion
b pointer to code portion B, in the drawings with a plain line
$a_1$, $a_2$ parts of a
$b_1$, $b_2$ parts of b
$\underline{a}$, $\underline{a}'$, $\underline{a}''$ pointer vectors
$\underline{b}$, $\underline{b}'$, $\underline{b}''$ pointer vectors
d line distance
i, i' indices for memory lines
j position index for memory field within a memory line
$j_A(i), j_B(i')$ start positions of portions A and B
J number of memory fields in memory line
$J_{BIT}$ number of bit fields in memory line
$J_{TAG}$ number of tag fields in memory line
$j_X(i)$ partition index
K number of address bits
$L_{MAX}$ maximum partition length
$L_{MIN}$ minimum partition length
$L_\alpha(i)$, $L_\beta(i)$, L partition lengths
$n_A$, $n_B$ number of portions in a single partition
T(i) line tag for indicating $j_X(i)$
P number of portions
U number of bits in instruction portion
$V_A$, $V_B$ portion lengths
$V'_A$, $V'_B$ number of bits which go to a single memory line
$X_A$, $X_A$ field distance
Y combination
$z=(z_1, z_2)$ indication
$A, $B identifies instruction portions
α, β partitions
(1) (2) (3) as superscript, distinguish cases
ε element of
~ from to, including

What is claimed is:

1. A method for providing an address for first and second code portions stored in memory, said method comprising the steps of:

receiving indicators for a first length of said first code portion and for a second length of said second portion;

receiving definitions for first and second partitions of a first memory line and for third and fourth partitions of a second memory line;

receiving indications whether said first portion is stored in said first or third partition and whether said second portion is stored in said second or fourth partition and receiving first and second start positions for said first and second portions, respectively, selecting first and second pointers from disjunct pointer vectors, such that magnitudes of said pointers represent said first and second start positions, respectively, that a representation to whether said first portion is stored in said first or third partition and whether said second portion is stored in said second or fourth partition is represented by the pointer vectors to which said first and second pointers belong; and storing said pointers in said address.

2. The method of claim 1 wherein said pointer vectors represent:

a first case for which said first and second portions are stored in said first and second partitions, respectively, a second case for which said first portion is stored in said first partition and said second portion is stored in said fourth partition, and a third case for which said first portion is stored in said third partition and said second portion is stored in said second partition.

3. The method of claim 1 wherein in said selecting step, said disjunct pointer vectors are complementary vectors.

4. A memory having address lines for storing addresses and data lines for storing pluralities of paired data portions, wherein the data lines are virtually partitioned and stored first data portions in first partitions with first offsets and store second data portions in second partitions with second offsets, for each pair of the data portions, the second data portion is located in an adjacent data line to that of the first data portion; and wherein each of the addresses stored in the address lines having (i) base addresses for identifying the associated data lines and (ii) pointers which indicate the first and second offsets of the associated pair of data portions.

5. The memory of claim 4 wherein the addresses further comprise indicators for distinguishing whether the first and second data portions are stored in identical data lines or in consecutive data lines.

6. The memory of claim 4 wherein magnitudes of the pointers also indicate whether (1) the first data portion and the second data portion are stored together in a single data line (2) the first data portion is stored in a first data line and the second data portion is stored in a second data line, or (3) the second data portion is stored in a first data line and the first data portion is stored in a second data line.

7. The memory of claim 4 wherein the address lines each have 5 fields for storing a first pointer and 5 fields for storing a second pointer, and wherein the data lines each have 31 bit fields partitioned into partitions which with 12 bits fields and 19 bit fields.

8. The memory of claim 4 further comprising a converter which (i) receives bits stored in the data line among them the data portions, (ii) receives the pointers to identify the data portions and (iii) substantially simultaneously converts first and second data portions to instructions.

9. The memory of claim 4 wherein the data lines comprise indications for lengths of first and second partitions.

10. The memory of claim 4 wherein pointers belong to disjunct pointer vectors and thereby distinguish storage location of first and second data portions.

11. The memory of claim 4 wherein the pointers belong to complementary pointer vectors and thereby distinguish storage locations of first and second data portions.

* * * * *

UNITED STATES PATENT AND TRADEMARK OFFICE
CERTIFICATE OF CORRECTION

PATENT NO. : 6,178,491 B1
DATED : January 23, 2001
INVENTOR(S) : Arie Ben-Zphraim et al.

It is certified that error appears in the above-identified patent and that said Letters Patent is hereby corrected as shown below:

Title Page
(75) Inventors: change "all of (IL)" to read --all of Israel--

Signed and Sealed this

Tenth Day of July, 2001

*Attest:*

*Attesting Officer*

NICHOLAS P. GODICI
*Acting Director of the United States Patent and Trademark Office*